DEVICE FOR TRANSMITTING FREQUENCY-MODULATED OSCILLATIONS
Filed Nov. 15, 1961
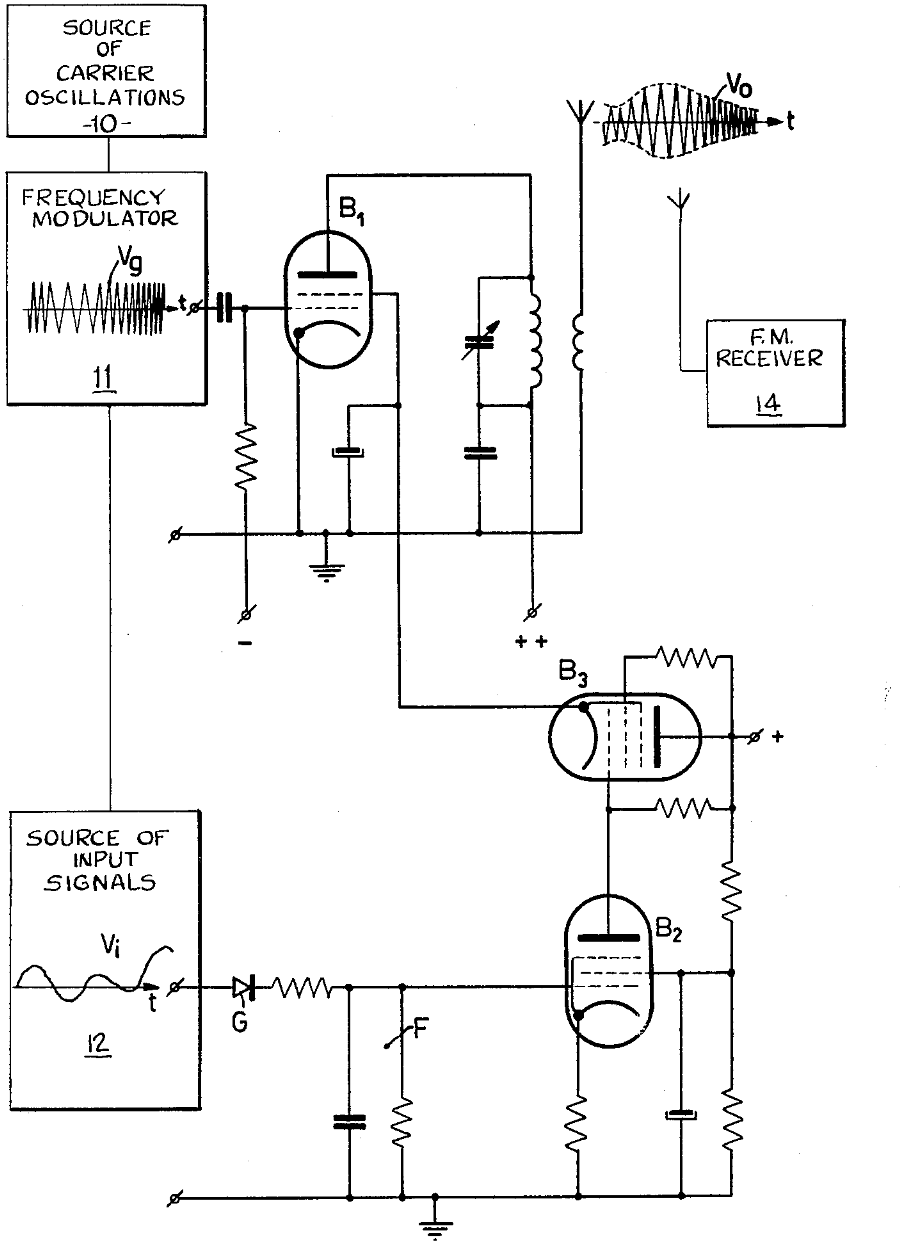
INVENTOR
JAN JOHANNES GELUK
BY Frank R. Trifari
AGENT United States Patent Office 3,213,368

Patented Oct. 19, 1965

3,213,368

DEVICE FOR TRANSMITTING FREQUENCY-MODULATED OSCILLATIONS

Jan Johannes Geluk, Hilversum, Netherlands, assignor to North American Philips Company, Inc., New York, N.Y., a corporation of Delaware Filed Nov. 15, 1961, Ser. No. 152,494
Claims priority, application Netherlands, Nov. 24, 1960, 258,345
3 Claims. (Cl. 325—47)

The invention relates to a circuit for the transmission of frequency-modulated oscillations and has for its object to provide a measure for attaining a satisfactory transmission quality with a circuit operating at optimum efficiency.

The invention is characterized in that the amplitude of the transmitted oscillations is reduced with an increasing frequency sweep.

There are known different transmission systems for frequency-modulated oscillations, in which the amplitude of the transmitted signal is varied in the rhythm of oscillations not correlated with the frequency modulation. In such devices it is possible to transmit a plurality of information signals independently of each other; one signal is obtained by employing, at the receiver end, a circuit which does not respond to the frequency sweep of the transmitted signal, but solely demodulates the amplitude modulation thereof; the other signal is obtained by limiting the amplitude of the incoming signal, subsequent to amplification, and by subsequently demodulating it in frequency. In the circuit according to the invention, on the contrary, the amplitude of the transmitted signal is correlated with its frequency sweep in a sense such that with an increasing frequency sweep the amplitude is reduced. The amplitude variation of the transmitted signal produced is not further utilized for the transmission of information, and a receiver is employed which responds solely to the freqeuncy sweep and does not respond to the amplitude variations of the transmitted signal.

The invention is based on the recognition of the fact that the influence of an interference signal on the information transmisison diminishes approximately inversely proportional to the frequency sweep and to the amplitude of the transmitted signal. If the final stage of the transmitter is proportioned for working a given maximum signal, the influence of an interference oscillation will be at the maximum with an absence of frequency sweep (central frequency) of the transmitted oscillations. This influence is considerably reduced as the frequency sweep of the transmitted signal is increased. Under these conditions the phase modulation of the transmitted signal produced by the interference signal will soon be nullified as compared with the desired information of the signal. In these circumstances it is permissible, in accordance with the invention, to reduce the amplitude of the transmitted signal so that a more economic operation of the transmitter final stage becomes possible. The risk of interferences is thus, indeed, greater, but these incidental interferences will be of little significance owing to the then prevailing great information amplitudes. Owing to this measure, even an abrupt increase in the information amplitude can no longer give rise to additional distortion, since the amplitude of the transmitted signal is reduced from a higher value. If this amplitude control lags behind the abrupt growth of information, this would only give rise to signal-to-noise ratio which is better than is required.

The abrupt decrease in information amplitude does not occur with many kinds of information. If the information is, for example, of an audio-frequency character, this transitional phenomenon is moveover gradually reduced by the usually occurring reverberation. Thus, possible interferences during the still small amplitude of the transmitted oscillations are practically masked; the control-system need therefore not be a quick-action system or in other words, the device by means of which the control-voltage is produced, may have a very small frequency range.

Owing to the measure according to the invention it is furthermore ensured that cross-talk is materially reduced in neighbouring transmission channels as is the case with carrier telephony systems, since in the controlled channel either low frequency modulation with high transmitter amplitude or a deeper frequency modulation, but with lower transmitter amplitude prevails. In both cases the spectrum components penetrating from a neighbouring channel into the desired channel remain comparatively small.

If the frequency modulation is mostly prevailing and strong, as is the case with broadcast transmitters, the transmission amplitude may be increased during the modulation intervals with respect to non-controlled, but otherwise identical generators. The signal-interference ratio of the information is in this case improved. The maximum power of the generator has then also increased.

The invention will be described more fully with reference to the drawing.

The valve B1 represents the transmitter final stage of the frequency-modulation transmitting circuit. The carrier oscillations from source 10 are frequency-modulated in modulator 11 by the input signals derived from source 12. The frequency-modulated high-frequency oscillations $V_g$ are fed to the grid of the valve B1. The frequency modulation of these oscillations varies in the rhythm of a modulating (information) oscillation $V_i$. This oscillation $V_i$ is rectified with the aid of a rectifier G, so that across a filter F occurs a voltage corresponding to the envelope of the information $V_i$. This voltage is applied to the grid of a valve B2, which supplies an amplified signal, which is fed to the grid of a valve B3. The valve B3 operates as a control-valve for the current supply to the screen-grid of the valve B1. At the anode of the valve B1 thus occurs an oscillation $V_o$, controlled in amplitude in accordance with the frequency sweep of the frequency-modulated signal, which oscillation is fed to the transmitter aerial.

The receiver 14 of the system is preferably a receiver that is responsive only to frequency modulation, i.e., it is not responsive to amplitude variations.

What is claimed is:

1. A frequency modulation transmitter circuit comprising a source of input signals, a source of carrier oscillations, means for frequency-modulating said carrier oscillations with said input signals to produce frequency-modulated oscillations having a frequency deviation substantially proportional to the amplitude of said input signals, rectifier means connected to said source of input signals for providing a control signal that is proportional to the envelope of said input signals and substantially independent of the frequency of said input signals, amplitude modulator means, and means for modulating said frequency-modulated oscillations in said amplitude modulator means with said control signal to vary the amplitude of said frequency-modulated oscillations inversely with respect to the amplitude of the envelope of said input signals.

2. The circuit of claim 1, in which said amplitude modulator means comprises an electron discharge device having a screen grid electrode, comprising means for applying said control signal to said screen grid electrode.

3. A frequency modulation signal transfer system comprising a source of input signals, a frequency modulator, means to apply said input signals to said frequency modulator to produce frequency-modulated oscillations having a frequency deviation substantially proportional to the amplitude of said input signals, rectifier means coupled to said source of input signals to produce a control signal that is proportional to the envelope of said input signals and substantially independent of the frequency of said input signals, amplitude controlling means to vary the amplitude of said frequency-modulated oscillations in accordance with said control signal in a sense to reduce the amplitude of said oscillations with increasing envelope of said input signals, means to transmit said frequency-modulated oscillations thus subjected to amplitude variations, and receiving means which responds solely to the frequency deviations of the transmitted oscillations.

References Cited by the Examiner

UNITED STATES PATENTS

| | | | |
|---|---|---|---|
| 1,734,038 | 11/29 | Levy | 332—17 |
| 2,047,312 | 7/36 | De Marest | 325—45 |
| 2,103,847 | 12/37 | Hansell | 332—17 |
| 2,142,335 | 1/39 | Scott | 325—139 |
| 2,342,943 | 2/44 | Kell | 332—17 |
| 2,712,598 | 5/55 | Pattamaly | 332—17 |
| 2,969,459 | 1/61 | Hern | 325—344 |
| 3,054,073 | 9/62 | Powers | 332—17 |
| 3,098,203 | 7/63 | Starn | 332—64 |

DAVID G. REDINBAUGH, *Primary Examiner.*